(12) United States Patent
Shah

(10) Patent No.: US 6,889,283 B2
(45) Date of Patent: May 3, 2005

(54) METHOD AND SYSTEM TO PROMOTE ARBITRATION PRIORITY IN A BUFFER QUEUE

(75) Inventor: Paras A. Shah, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 09/792,835

(22) Filed: Feb. 23, 2001

(65) Prior Publication Data
US 2002/0120799 A1 Aug. 29, 2002

(51) Int. Cl.[7] .............................................. G06F 13/36
(52) U.S. Cl. ...................................... 710/309; 710/242
(58) Field of Search ........................... 710/20, 21, 29, 710/116, 119, 242, 243, 305, 309; 370/402

(56) References Cited

U.S. PATENT DOCUMENTS

| | | | | |
|---|---|---|---|---|
| 4,785,394 A | * | 11/1988 | Fischer | 710/114 |
| 5,909,594 A | * | 6/1999 | Ross et al. | 710/20 |
| 6,175,889 B1 | * | 1/2001 | Olarig | 710/309 |
| 6,266,731 B1 | * | 7/2001 | Riley et al. | 710/313 |
| 6,480,917 B1 | * | 11/2002 | Moertl et al. | 710/119 |

* cited by examiner

Primary Examiner—Khanh Dang

(57) ABSTRACT

A technique is provided for prioritizing access to a bus for read completion transactions. The technique incorporates logic within an ASIC bridge, wherein split completion transactions are designated a priority level that facilitates the delivery of the requested data to a periphery device. Particularly, logic within the ASIC grants a read completion transaction a level one priority designation, which provides access to the bus to a requesting device prior to devices designated with a level two priority designation.

23 Claims, 4 Drawing Sheets

METHOD AND SYSTEM TO PROMOTE ARBITRATION PRIORITY IN A BUFFER QUEUE

FIELD OF THE INVENTION

The present invention relates generally to a method for arbitrating access to a bus. Particularly, the present invention relates to method for arbitrating access to a bus according to priority of the transaction in a PCI-X system.

BACKGROUND OF THE RELATED ART

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A conventional computer system typically includes one or more central processing units (CPUs) and one or more memory subsystems. Computer systems also typically include peripheral devices for inputting and outputting data. Some common peripheral devices include, for example, monitors, keyboards, printers, modems, hard disk drives, floppy disk drives, and network controllers. The various components of a computer system communicate and transfer data using various buses and other communication channels that interconnect the respective communicating components.

One of the important factors in the performance of a computer system is the speed at which the CPU operates. Generally, the faster the CPU operates, the faster the computer system can complete a designated task. One method of increasing the speed of a computer is using multiple CPUs, commonly known as multiprocessing. With multiple CPUs, tasks may be executed substantially in parallel as opposed to sequentially.

However, the addition of a faster CPU or additional CPUs can result in different increases in performance among different computer systems. Although it is the CPU that executes the algorithms required for performing a designated task, in many cases it is the peripherals that are responsible for providing data to the CPU and handling the processed data from the CPU. When a CPU attempts to read or write to a peripheral, the CPU often "sets aside" the algorithm that is currently executing and diverts to executing the read/write transaction (also referred to as an input/output transaction or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction associated therewith can create a bottleneck in the overall performance of the computer system. As the CPU becomes faster, the amount of time it expends executing algorithms becomes less of a limiting factor compared to the time expended in performing I/O transactions. Accordingly, the improvement in the performance of the computer system that could theoretically result from the use of a faster CPU or additional CPUs may become substantially curtailed by the bottleneck created by the I/O transactions. Moreover, it can be readily appreciated that any performance degradation due to such I/O bottlenecks in a single computer system may have a stifling affect on the overall performance of a computer network in which the computer system is disposed.

As CPUs have increased in speed, the logic controlling I/O transactions has evolved to provide faster I/O transactions. Such logic, usually referred to as a "bridge," is typically an application specific integrated circuit (ASIC). Thus, most I/O transactions within a computer system are now largely controlled by these ASICs. For example, Peripheral Component Interconnect (PCI) logic is instilled within buses and bridges to govern I/O transactions between peripheral devices and the CPU.

Today, PCI logic has evolved into the Peripheral Component Interconnect Extended (PCI-X) to form the architectural backbone of the computer system. PCI-X logic has features that improve upon the efficiency of communication between peripheral devices and the CPU. For instance, PCI-X technology increases bus capacity to more than eight times the conventional PCI bus bandwidth. For example, a 133 MB/s system with a 32 bit PCI bus running at 33 MHz is increased to a 1060 MB/s system with the 64 bit PCI bus running at 133 MHz.

An important feature of the new PCI-X logic is that it can provide backward compatibility with PCI enabled devices at both the adapter and system levels. For example, although PCI devices cannot run in PCI-X mode, the bus is still operable in PCI mode. However, the devices will operate at the slower PCI speed and operate according to PCI specifications.

Generally, the host bridge in a computer system handles a large amount of transactions such as read and write requests. PCI-X logic devices enable a requesting device to make only one data transaction request and relinquish the bus, rather than reissuing the transaction on the bus to poll for a response. Thus, a bus can only perform one request at any given moment. Therefore, if a device wishes to initiate a transaction, the device must wait until an arbiter device grants use of the bus to it. The arbiter device is permitted to assign priorities using any method that grants each requesting device fair access to the bus. Previously, no priority was given to the type of transaction requesting the bus. Therefore, when transactions were requested, access to the bus was granted on a first requested-first served basis. There is a need for a technique to allocate the bus based on the priority of the transaction while retaining the ability of granting access to the bus on a first requested-first served basis.

The present invention may address one or more of the problems discussed above.

BRIEF DESCRIPTION FO THE DRAWINGS

The foregoing and other advantages of the invention will become apparent upon reading the following detailed description and upon reference to the drawing in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
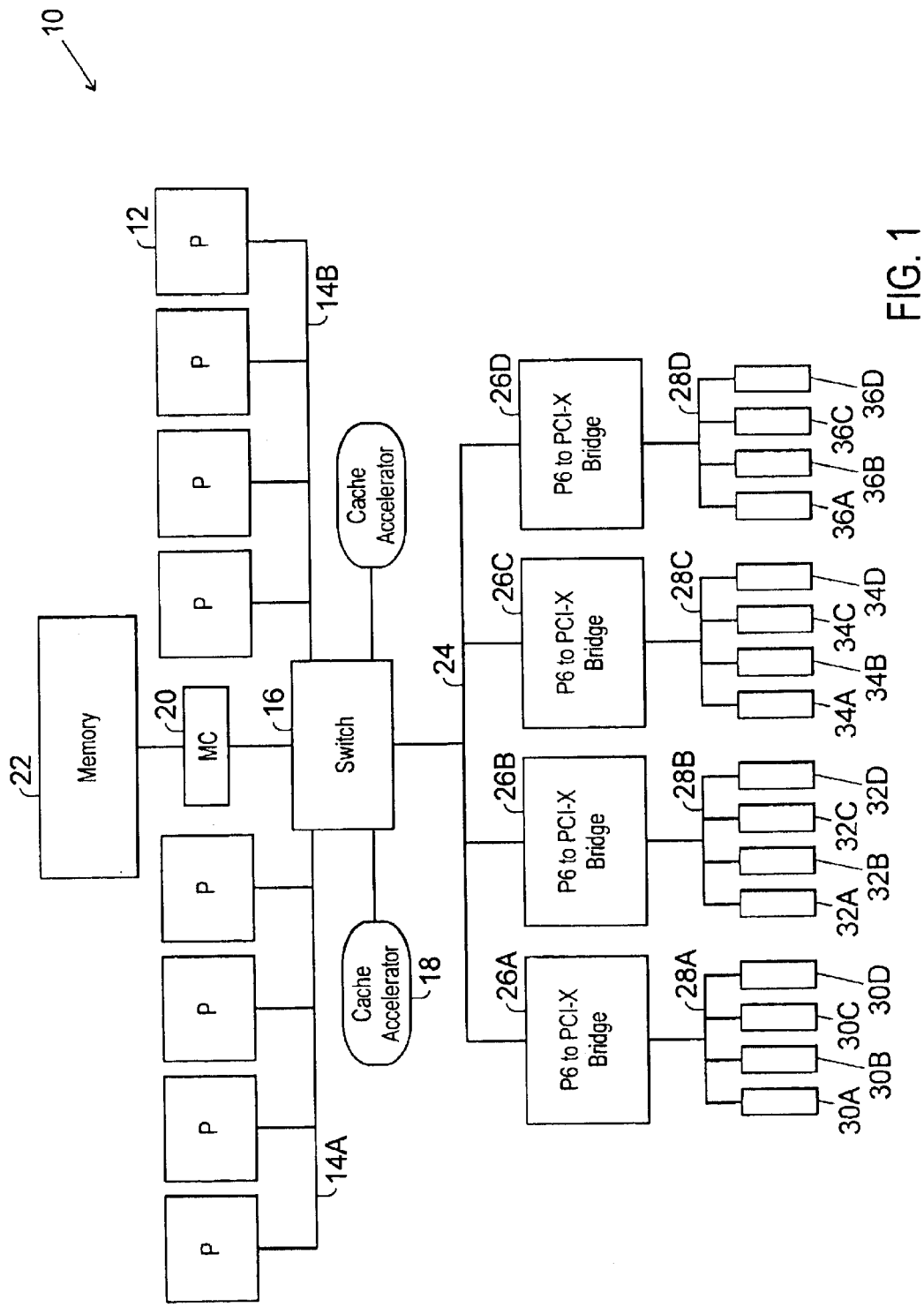
FIG. 1 illustrates a diagram of an exemplary computer system in accordance with the present invention.

Turning now to the drawings, and referring initially to FIG. 1, a multiprocessor computer system, for example a Proliant 8500 PCI-X from Compaq Computer Corporation, is illustrated and designated by the reference numeral 10. In this embodiment of the system 10, multiple processors 12 control many of the functions of the system 10. The processors 12 may be, for example, Pentium, Pentium Pro, Pentium II Xeon (Slot-2) or Pentium III processors available from Intel Corporation. However, it should be understood that the number and type of processors are not critical to the technique described herein and are merely being provided by way of example.

Typically, the processors 12 are coupled to one or more processor buses. In this embodiment, half of the processors 12 are coupled to a processor bus 14A, and the other half of the processors 12 are coupled to a processor bus 14B. The processor buses 14A and 14B transmit the transactions between the individual processors 12 and a switch 16. The switch 16 routes signals between the processor bus 14A and 14B, cache accelerator 18, and a memory controller 20. A crossbar switch is shown in this embodiment, however, it should be noted that any suitable type of switch or connection may be used in the operation of the system 10. The memory controller 20 may also be of any type suitable for such a system, such as, a Profusion memory controller. It should be understood that the number and type of memory, switches, memory controllers, and cache accelerators are not critical to the technique described herein and are merely being provided by way of example.

The switch 16 is also coupled to an input/output (I/O) bus 24. As mentioned above, the switch 16 directs data to and from the processors 12 through the processor buses 14A and 14B, as well as the cache accelerator 18 and the memory 22. In addition, data may be transmitted through the I/O bus 24 to one of the PCI-X bridges 26 A–D. Each PCI-X bridge 26 A–D is coupled to each one of the PCI-X buses 28 A–D. Further, each one of the PCI-X buses 28 A–D terminates at a series of slots or I/O interfaces 30 A–D, 32 A–D, 34 A–D, 36 A–D, to which peripheral devices may be attached. For example, in the present embodiment, PCI-X bridge 26A is coupled to bus 26A, and bus 26A is coupled to I/O interfaces 30 A–D. It should be noted that the PCI-X bridges 26 B–D, buses 28 B–D and I/O interfaces 32 A–D, 34 A–D, 36 A–D are similarly coupled.

Generally, each one of the PCI-X bridges 26 A–D is an application specific integrated circuit (ASIC). Thus, each one of the PCI-X bridges 26 A–D contain logic devices that process input/output transactions. Particularly, the ASIC chip may contain logic devices specifying ordering rules, buffer allocation, specifying transaction type, and logic devices for receiving and delivering data, and for arbitrating access to each of the buses 28 A–D. Additionally, the logic devices may include address and data buffers, as well as arbitration and bus master control logic for the PCI-X buses 28 A–D. The PCI-X bridges 26 A–D may also include miscellaneous logic devices, such as counters and timers as conventionally present in personal computer systems, as well as an interrupt controller for both the PCI and I/O buses and power management logic.

Typically, a transaction is initiated by a requester, e.g., a peripheral device, coupled to one of the I/O interfaces 30 A–D-36 A–D. The transaction is then transmitted to one of the PCI-X buses 28 A–D depending on the peripheral device utilized and the location of the I/O interface 30 A–D-36 A–D. The transaction is then directed towards the appropriate PCI-X bridge 26 A–D. Logic devices within the bridge 26 A–D generally allocate a buffer where data may be stored. The transaction is directed towards either the processors 12 or to the memory 22, depending on the type of transaction. Once the transaction is processed, the transaction data is returned to the bridge 26 A–D. The retrieved data is typically stored within the allocated buffer of the respective bridge 26 A–D. The data remains stored within the buffer until the bridge 26 A–D gains access to the PCI/PCI-X bus 28 A–D is granted. The data is then delivered to the requesting device.

In the present embodiment, each one of the buses 28 A–D is potentially coupled to five requesting devices, up to four peripheral devices and to one of the bridges 26 A–D. It should be noted that only one device may use a particular bus 28 A–D to transmit data at any given time. For instance, on any one clock cycle, only one of the requesting devices may use the bus 28 A–D to transmit data. Thus, when a transaction is requested, the device will have to wait until the bus 28 A–D is available for access. It should further noted that the buses 28 A–D may be coupled to additional peripheral devices.

PCI-PCI-X specifications require the arbitration of the bus 28 A–D to be "fair". A fair arbitration algorithm is one in which all devices that request the bus 28A are eventually granted access, independent of other requests. However, a "fair" algorithm is not required to give equal access to every requester, thereby allowing some requesters greater access to the bus 28A than others. One example of a fair algorithm is a "level one round-robin" algorithm in which a logic device grants the bus 28 A–D to the requesting bridge 26 A–D during every other request. Therefore, the requesting devices other than the bridge 26 A–D are granted access only during the intervening time. It should be noted that each bus grant interval provides sufficient time to transmit the transaction and relinquish the bus 28 A–D.

A fixed-priority algorithm, in which one device is always granted the bus and blocks another device indefinitely, is not "fair." For instance, a device that is guaranteed access to the bus 26A–D during every clock cycle would not be supported by the PCI/PCI-X specifications, and therefore cannot be utilized in such an exemplary computer system 10. Two types of allocation algorithms utilized in the present embodiment providing priority to a requesting device will be discussed more fully below.

Figure 2:
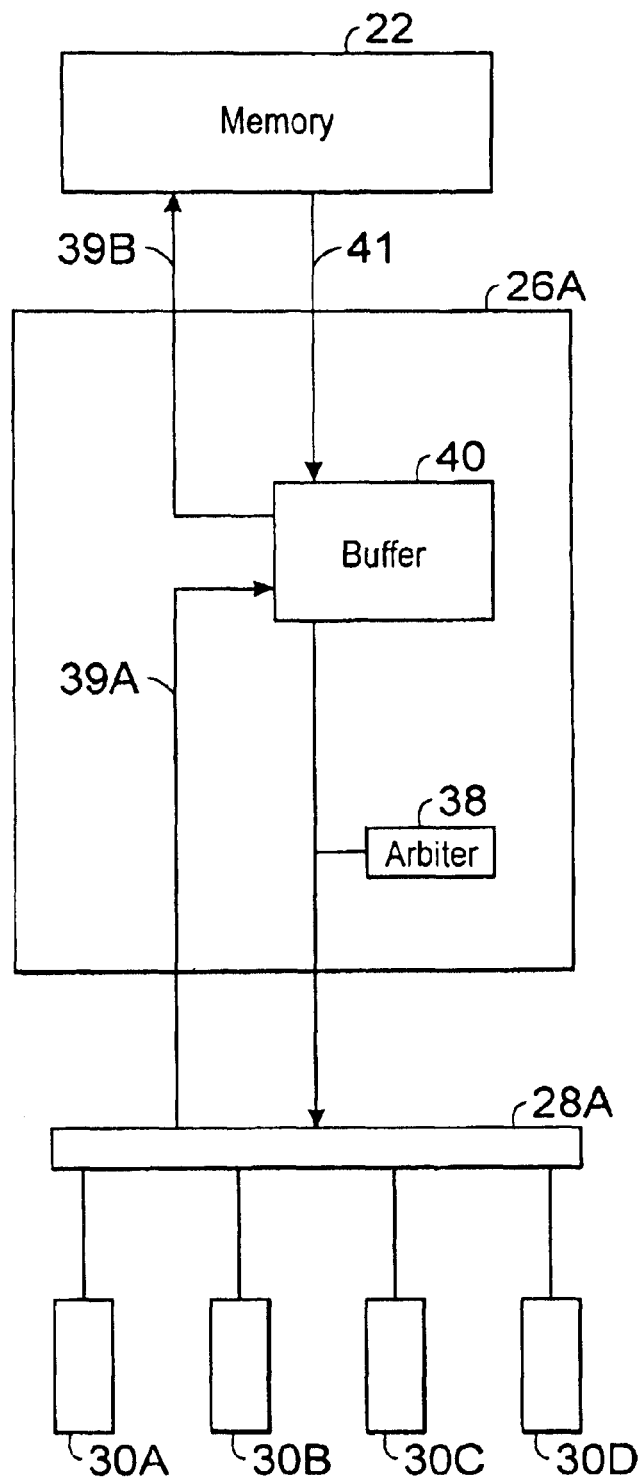
FIG. 2 illustrates components and connectivity of the bridge in an exemplary computer system in accordance with the present invention.

FIG. 2 illustrates a more detailed diagram of one of the bridges 26A and its associated buses 28A and I/O interface slots 30A–D. As mentioned above, the bridge 26A receives transaction requests from a request or through a peripheral device coupled to an I/O Interface 30A–D. The transaction is received by the bridge 26A via the bus 28A. As mentioned above, the bus 28A may only administer one transaction at a time. However, peripheral devices coupled to I/O interfaces 30 A–D may all initiate transactions. Generally, only one device may be granted access to the bus 28A to transmit the transaction to the bridge 26A. Therefore, as one transaction is being transmitted, other transactions are held until the bus 28A completes transmitting the transaction.

Typically, an arbiter device 38 located within each one of the bridges 26A–D provides a method for granting access to the bus 28A. Particularly, the arbiter device 38 is configured to grant access to the bus 28A for a requesting device according to priority. Thus, the arbiter device 38 is permitted to assign priorities using any method that grants each requesting device fair access to the bus 28A. It should be noted that an operator typically configures the arbiter device 38 to provide specific priority designations to the requesting devices.

The arbiter device 38 typically grants all requesting devices a level two priority designation. Level two priority designation is based on the first requested-first served allocation algorithm. For example, the first device to request the bus 28A is granted access when the bus 28A becomes available. Therefore, all the requesting devices including the bridge 26A have equal priority. It should be noted that priority level designations may be set for upstream and downstream transactions. Upstream transactions are transactions generated by a peripheral device that are transmitted toward the processors 12 or the memory 22 of the system 10. Alternatively, downstream transactions are transactions that are transmitted from the memory 22 or processors 12 to the bridge 26A for delivery to the peripheral devices. Typically, devices requesting access to the bus 28A for upstream transactions have equal priority. It should be noted that in alternative embodiments upstream transactions may also be provided with varying priority levels, thus allowing certain devices to have a higher priority designation. In the present embodiment, however, devices transmitting a split completion transaction (a downstream transaction) are provided a level one priority designation. For example, providing the bridge 26A with a level one priority designation enables the bridge 26A to deliver received data to a peripheral device almost immediately, rather than holding the data until the bridge 26A gains access to the bus 28A.

Once the requesting device is granted the bus 28A, the transaction it runs may result in an allocation of a buffer 40 inside the bridge 26A. This allocation causes the assertion of a signal 39A within the bridge 26A to the buffer 40. Data regarding the transaction type is typically stored in the buffer 40. The transaction signal 39B requesting data is then transmitted toward the processors 12 or the memory 22. Generally, upstream transactions are transmitted to the processors 12 or the memory 22. Whereas, downstream transactions are typically transaction signals 41 that are transmitted from the processors 12 or memory 22 directed towards the peripheral devices.

It should be understood that in PCI-X split completion transactions, the data is retrieved from either the processors 12 or the memory 22 and returned to the bridge 26 A–D. The retrieved data is stored in the allocated buffer 40. Once the data is ready to be delivered, the bridge 26A requests the access to the bus 28A. The arbiter device 38 typically determines a priority level for each requesting device based upon the type of transaction at the time of allocating the transaction to the buffer 40. The buffer 40 sends a signal to the arbiter device 38 indicating that it is running a split completion transaction. Thus, the arbiter device 38 grants the level one priority level designation to the bridge 26 A–D. In the present technique, split completion transactions are granted a level one priority designation. Therefore, the bridge 26A is given priority over other requesting devices and is guaranteed faster access to the bus 28A. Thus, the requesting device does not have to wait a long period of time for the data. However, if the initiated transaction is not a split completion, then the bridge 26A is granted a level two priority designation. This keeps the bridge 26A from monopolizing the bus 28A, and the use of the bus 28A is then determined on a first requested-first served basis since all requesters share the same level two priority designation.

Figure 3B:
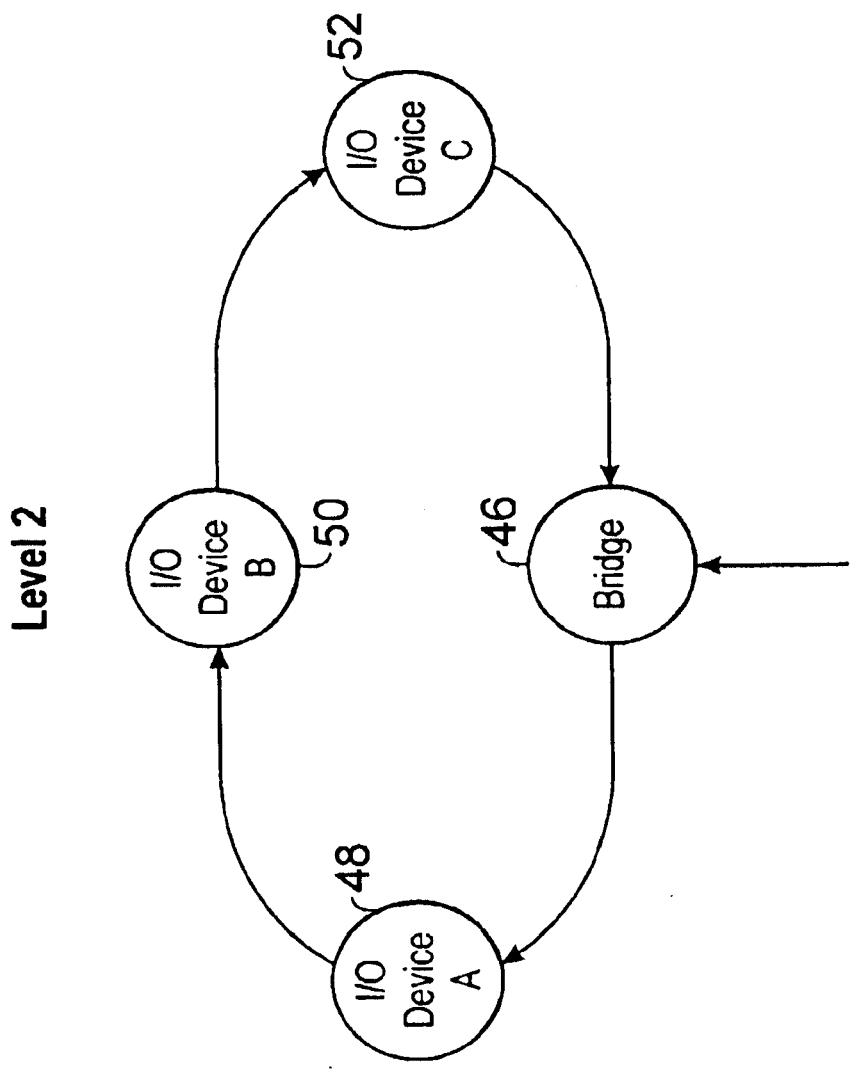
FIG. 3B is a transaction flow diagram representing a level two priority designation technique in accordance with the present invention.
Figure 3A:
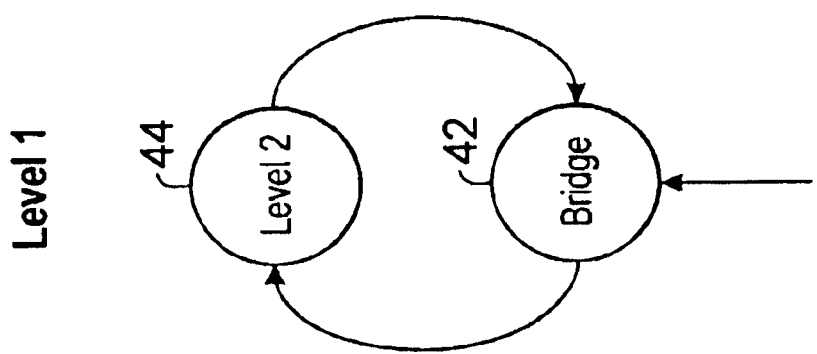
FIG. 3A is a transaction flow diagram representing a level one priority designation technique in accordance with the present invention.

FIG. 3A and FIG. 3B illustrate arbitration techniques applied by the present embodiment. Particularly, FIG. 3A illustrates an arbitration technique providing access to one of the buses 28 A–D based upon a level one priority designation. FIG. 3B illustrates the arbitration technique when all the requesting devices are granted a level two priority designation.

Level one priority designation in this embodiment is best suited for downstream transactions, such as PCI-X split completion transactions. However, as noted above, a level one priority designation may also be utilized in upstream transactions, thus providing one of the devices 30A–D, 32A–D, 34A–D, or 36A–D ability to receive a higher priority designation than other requesting peer devices. Even though the level one priority designation is granted based on whether the transaction is a split completion in this embodiment, other types of transactions may also warrant the grant of a level one priority depending upon operator preferences.

Once a split read request transaction is processed, the data is stored within the buffer 40. The bridge 26 A–D signals the arbiter device 38 that a split completion transaction is now ready to be run, and the data is ready to be delivered. The arbiter device 38 grants access to the bus 28 A–D based on the assigned priority designation. Once, the bus 28 A–D is available, the bridge 26 A–D is granted the bus 28 A–D (step 42). Subsequently, the next device requesting the bus 28 A–D receives access to the bus 28 A–D, once the bridge 26 A–D relinquishes the bus 28 A–D (step 44). A level one priority designation, in the present embodiment, provides the bridge 26 A–D with access to a bus 28 A–D once for every time a level two priority designated device gains access to the bus 28 A–D.

FIG. 3B illustrates an arbitration technique based on the level two priority designation method for arbitrating access. The arbiter device 38 grants access to the bus 28 A–D on a first requested-first served basis. In the present embodiment, the bridge 26 A–D is illustrated being granted the bus 28 A–D (step 46). Because each of the devices in this embodiment have a second level priority designation, the devices have equal priority concerning the bus. Once the bridge 26 A–D relinquishes the bus 28 A–D, I/O device A is granted the bus 28 A–D (step 48). Then, the transaction initiated by I/O device A is transmitted. After that transaction request is transmitted through the bus 28 A–D, the bus 28 A–D becomes available for the next requesting device. Thus, I/O device B is granted access to the bus 28 A–D (step 50). Next, I/O device C gains access to the bus 28 A–D, once the bus 28 A–D is available for use after being utilized by I/O device B (step 52). The cycle is continued as the bridge 26 A–D is once again in line to be granted the use of the bus 28 A–D (step 52). Note that if a device does not request access to the bus, it will not be given a grant to use it.

Figure 4:
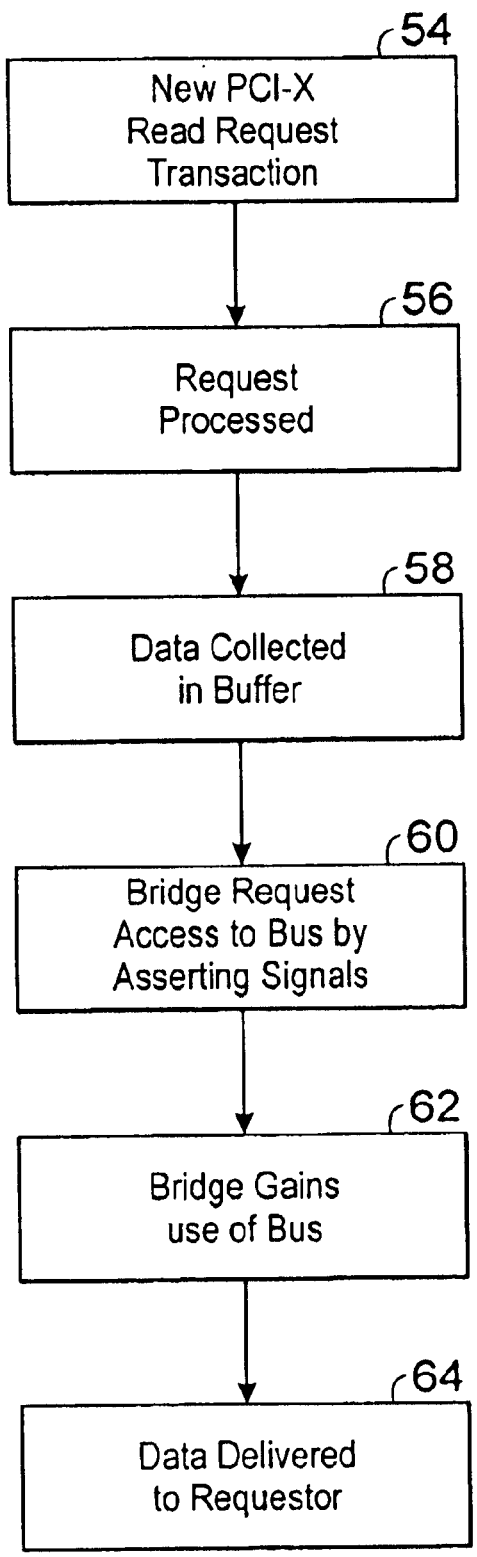
FIG. 4 is flowchart representing a method for arbitrating access to a bus in accordance with an exemplary computer system.

FIG. 4 is a flowchart for arbitrating access to the bus 28 A–D according to an exemplary technique implemented in the PCI-X system 10 for PCI-X read request transactions. Generally, the arbiter device 38 receives a signal from a requesting device indicating that device wants access to the bus (step 54). Thus, once the arbiter device 38 sees the request signal from the peripheral device, the arbiter device 38 may grant access to the bus 28 A–D. As mentioned above, in upstream transactions, the requesting devices are given a level two priority designation. Thus, all requesting devices have equal priority regarding access to the bus 28 A–D, as described in FIG. 3B. Once, the requesting device is granted the bus 28 A–D, the transaction request is transmitted and processed (step 56). Particularly, the transaction enters the bridge 26 A–D and is directed towards either the processors 12 or the memory 22, depending on the type of transaction. Subsequently, data is retrieved from the processors 12 or the memory 22 and stored in the buffer 40 (step 58). Next, the bridge 26 A–D requests access to the bus 28 A–D. The bridge 26 A–D requests access by transmitting signals to the arbiter device 38 (step 60). It should be noted that a first signal typically requests access to the bus 28 A–D, and a second signal identifies the transaction as a split completion. The arbiter device 38 subsequently grants a level one priority designation to the bridge 26 A–D. Thus, once the bus 28 A–D is available, the bridge 26 A–D is granted access to the bus 28 A–D (step 62). Then, the data is delivered to the requesting device (step 64). It should be noted that in upstream transactions, such as signal 39A the system 10 may also provide a higher level priority designation. Further, in downstream transactions, if the transaction is not a split completion, the arbiter device 38 may not grant a level one priority designation. Consequently, the bus 28A–D is granted to the next requesting device. Thus, the bridge 26A–D may gain access to the bus 28A–D, if it is the next requesting device.

Although, the present embodiment illustrates a technique for providing access to the bus 28 A–D for split completion transactions, it should be noted that any type of transaction may be provided access to the bus 28 A–D utilizing a similar technique. Furthermore, the present technique is not limited to just two levels of priority. For instance, added levels of priority may be provided depending on the type of transactions and operator preferences. In addition, any device requiring access to the bus 28 A–D may request a particular priority level designation.

It should also be understood that no specific arbitration algorithm is required. Therefore, any type of priority level designation method may be utilized. Thus, an operator may assign priorities using any method that grants each initiator fair access to the PCI/PCI-X bus 28 A–D. Additionally, requesting devices may assert their request at any clock cycle. Furthermore, the requesting device may also transmit any number of transactions as long as the device has access to the bus 28 A–D.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for arbitrating access to a bus between a bridge and a device coupled to the bus, wherein at least either the bridge or the device may be granted a level one priority designation or a level two priority designation, wherein the level one priority designation permits access to the bus before the level two priority designation comprising the acts of:

a) determining whether a transaction is a split completion transaction;
   b) if the transaction is a split completion transaction, granting the level one priority designation to the bridge; and
   c) if the transaction is not a split completion transaction, granting the level two priority designation to the bridge.

2. The method as in claim 1, wherein acts (b) and (c) are performed by an arbiter device.

3. The method as in claim 1, wherein acts (a) through (c) are performed by the bridge.

4. The method as in claim 2, wherein the arbiter device grants the bridge access to the bus.

5. The method as in claim 1, wherein act (b) comprises storing the level one priority designation signal within the bridge.

6. The method as in claim 1, wherein act (c) comprises storing a level two priority designation signal within the bridge.

7. The method as in claim 1, wherein if the bridge and the device are both granted the level one and level two priority designation, then permitting access to the bus based on which of the bridge and the device first request access to the bus.

8. The method as in claim 1, wherein a plurality of devices are coupled to the bus.

9. The method as in claim 8, wherein if the bridge and the device are both granted the level one and level two priority designation, then permitting access to the bus based on sequential ordering of the bridge and the devices.

10. A system for arbitrating access to a bus between a bridge and a device coupled to the bus, wherein at least one of the bridge and the device may be granted a level one priority designation or a level two priority designation, wherein a level one priority designation permits access to the bus before the level two priority designation comprising:

means for determining whether a transaction is a split completion transaction;
   means for granting the level one priority designation to the bridge, if the transaction is a split completion transaction; and
   means for granting the level two priority designation to the bridge, if the transaction is not a split completion transaction.

11. The system as in claim 10, wherein the means for granting the level one priority designation and level two priority designation to the bridge are performed by an arbiter device.

12. The system as in claim 10, wherein means for determining whether a transaction is a split completion is performed by the bridge.

13. The system as in claim 10, comprises means for storing the level one and level two priority designation within the bridge.

14. The system as in claim 10, comprises means for permitting access to the bus based on which of the bridge and the device first request access to the bus if the bridge and the device are both granted the level one and level two priority designation.

15. The system as in claim 10, wherein a plurality of devices are coupled to the bus.

16. The system as in claim 10, comprises means for permitting access to the bus based on sequential ordering of the bridge and the devices, if the bridge and the device are both granted the level one and level two priority designation.

17. A computer system comprising:
- at least one processor;
- a bridge operatively coupled to the at least one processor;
- a bus operatively coupled to the bridge and to a plurality of peripheral devices; and
- a logic device located in the bridge and configured to:
  - grant access to the bus between the bridge and the plurality of peripheral devices, wherein at least one of the bridge and the plurality of peripheral devices may be granted a level one priority designation or a level two priority designation, wherein a level one priority designation permits access to the bus before the level two priority designation;
  - determine whether a transaction is a split completion transaction;
  - grant the level one priority designation to the bridge, if the transaction is a split completion transaction; and
  - grant the level two priority designation to the bridge, if the transaction is not a split completion transaction.

18. The computer system as in claim 17, wherein the logic device comprises an arbiter device.

19. The computer system as in claim 18, wherein the arbiter device is located within the bridge.

20. The computer system as in claim 17, wherein level one priority designation grants access to the bridge, and the level one priority designation provides access to the bus prior to the level two priority.

21. The computer system as in claim 17, wherein the level one and level two priority designations are stored within the bridge.

22. The computer system as in claim 18, wherein the arbiter device permits access to the bus based on which of the bridge and one of the plurality of peripheral devices first request access to the bus, if the bridge and the one of the plurality of peripheral devices are both granted the level one and level two priority designation.

23. The computer system as in claim 18, wherein the arbiter device permits access to the bus based on sequential ordering of the bridge and one of the plurality of peripheral devices, if the bridge and the one of the plurality of peripheral devices are both granted the level one and level two priority designation.

* * * * *